US011416502B2

(12) United States Patent
Wang

(10) Patent No.: US 11,416,502 B2
(45) Date of Patent: Aug. 16, 2022

(54) METHOD AND APPARATUS FOR MINING OFFLINE RESOURCES

(71) Applicant: Baidu Online Network Technology (Beijing) Co., Ltd., Beijing (CN)

(72) Inventor: Huan Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 251 days.

(21) Appl. No.: 15/764,568

(22) PCT Filed: Jun. 17, 2016

(86) PCT No.: PCT/CN2016/086220
§ 371 (c)(1),
(2) Date: Mar. 29, 2018

(87) PCT Pub. No.: WO2017/143703
PCT Pub. Date: Aug. 31, 2017

(65) Prior Publication Data
US 2020/0242113 A1    Jul. 30, 2020

(30) Foreign Application Priority Data
Feb. 24, 2016 (CN) .......................... 201610101489.0

(51) Int. Cl.
G06F 16/2458    (2019.01)
G06F 16/35      (2019.01)
(Continued)

(52) U.S. Cl.
CPC ........ *G06F 16/2465* (2019.01); *G06F 16/242* (2019.01); *G06F 16/24578* (2019.01);
(Continued)

(58) Field of Classification Search
CPC ........ G06F 40/30; G06F 16/35; G06F 16/334; G06F 40/263; G06F 16/24578;
(Continued)

(56) References Cited

U.S. PATENT DOCUMENTS

| 7,788,131 B2 | 8/2010 | Nong et al. |
| 7,945,484 B1* | 5/2011 | Tam ....................... G06Q 30/06 705/26.1 |
| 8,676,777 B1* | 3/2014 | Prahladka ........... G06F 16/9537 707/706 |
| 2007/0143176 A1 | 6/2007 | Nong et al. |

(Continued)

FOREIGN PATENT DOCUMENTS

| CN | 102663627 | 9/2012 |
| CN | 103136224 A | 6/2013 |

(Continued)

OTHER PUBLICATIONS

International Search Report dated Dec. 1, 2016 for International Application No. PCT/CN2016/086220, 6 pages.
Written Opinion of the International Searching Authority dated Dec. 1, 2016 for International Application No. PCT/CN2016/086220, 4 pages.

*Primary Examiner* — Yuk Ting Choi
(74) *Attorney, Agent, or Firm* — Knobbe, Martens, Olson & Bear, LLP

(57) ABSTRACT

The present disclosure discloses a method and apparatus for mining offline resources. The method includes: acquiring at least two pieces of user search log information; acquiring a user demand characteristic set according to a search formula included in the user search log information, the user demand characteristic set including a keyword set; and matching the user demand characteristic set with a defined offline resource set, to acquire offline resource information corresponding to the user demand characteristic set.

18 Claims, 7 Drawing Sheets

(51) Int. Cl.
    *G06F 16/242*     (2019.01)
    *G06F 16/2457*     (2019.01)
    *G06F 40/279*     (2020.01)
    *G06F 40/30*     (2020.01)
    *G06Q 30/02*     (2012.01)

(52) U.S. Cl.
    CPC .......... *G06F 16/353* (2019.01); *G06F 40/279* (2020.01); *G06F 40/30* (2020.01); *G06Q 30/0201* (2013.01); *G06Q 30/0205* (2013.01); *G06Q 30/0282* (2013.01); *G06F 2216/03* (2013.01)

(58) Field of Classification Search
    CPC ................ G06F 16/3322; G06F 16/285; G06F 16/338; G06F 16/358; G06Q 30/0277; G06Q 30/02; G06Q 30/0255
    See application file for complete search history.

(56) References Cited

U.S. PATENT DOCUMENTS

| | | | | |
|---|---|---|---|---|
| 2011/0113063 | A1* | 5/2011 | Schulman | G06F 16/907 |
| | | | | 707/771 |
| 2012/0109946 | A1* | 5/2012 | Qian | G06Q 30/0601 |
| | | | | 707/723 |
| 2013/0262226 | A1* | 10/2013 | LaChapelle | G06Q 30/0269 |
| | | | | 705/14.53 |
| 2013/0268337 | A1 | 10/2013 | Morello | |
| 2016/0110428 | A1* | 4/2016 | Vasenkov | G06F 16/367 |
| | | | | 707/776 |
| 2016/0117595 | A1 | 4/2016 | Zhang et al. | |

FOREIGN PATENT DOCUMENTS

| | | |
|---|---|---|
| CN | 104281622 A | 1/2015 |
| CN | 105069102 A | 11/2015 |
| JP | 2003173352 A | 6/2003 |

* cited by examiner

METHOD AND APPARATUS FOR MINING OFFLINE RESOURCES

CROSS-REFERENCE TO RELATED APPLICATION

This application is the U.S. National Phase Application under 35 U.S.C. § 371 of International Application No. PCT/CN2016/086220, filed Jun. 17, 2016, designating the U.S. and published as WO 2017/143703 A1 on Aug. 31, 2017 which claims the priority of Chinese Application No. 201610101489.0, filed on Feb. 24, 2016, the content of each of which is incorporated herein by reference in its entirety.

TECHNICAL FIELD

The present disclosure relates to the information processing technology, and specifically to a method and apparatus for mining offline resources.

BACKGROUND

O2O (Online-to-Offline E-commerce) is different from traditional E-commerce models including B2C (Business-to-Customer E-commerce), B2B (Business-to-Business E-commerce) and C2C (Customer-to-Customer E-commerce). O2O is to bring online customers into real stores, and the customers pay for offline products and services online, and then enjoy the services offline. The stores push offline store information to Internet users by way of releasing discount information or service introduction information on an O2O online platform (e.g., Baidu Nuomi). The Internet users are changed to offline customers of the stores. Accordingly, the offline services may attract the customers online, and the customers may pick the services and pay online. For the O2O online platform, a key point to implement the O2O is to extract offline merchant resources and collaborate with the merchant resources online, so as to achieve a perfect connection between the Internet and the merchant on the ground.

Existing solutions for extracting the merchant resources mainly include:

1) a solution based on historical data, where the merchants' specialties are determined through market historical data within a certain period, and a merchant is selected according to the brand awareness;

2) a solution based on competitive product data, where an appropriate merchant is selected according to the merchant's display and sales volumes of the competitive products; and 3) a solution based on human factors, where a general direction is provided by a management, and sales people cooperate and communicate with a corresponding merchant.

Main defects of the existing solutions are: incompleteness of the analysis dimensions, one-sided data sources, insufficient timeliness of data, a serious waste on perceptions of actual consumers and negligence of actual consumption demands of the users.

SUMMARY

In view of the above, embodiments of the present disclosure provide a method and apparatus for mining offline resources to optimize an existing technique of extracting offline merchant resources, so as to satisfy an actual demand of acquiring offline resources of an online user.

In a first aspect, the embodiments of the present disclosure provide a method for mining offline resources, including:

acquiring at least two pieces of user search log information;

acquiring a user demand characteristic set according to a search formula included in the user search log information, the user demand characteristic set including a keyword set; and matching the user demand characteristic set with a defined offline resource set, to acquire offline resource information corresponding to the user demand characteristic set.

In a second aspect, the embodiments of the present disclosure further provide an apparatus for mining offline resources, including:

a search log information acquiring module, configured to acquire at least two pieces of user search log information;

a user demand characteristic set acquiring module, configured to acquire a user demand characteristic set according to a search formula included in the user search log information, the user demand characteristic set including a keyword set; and an offline resource information acquiring module, configured to match the user demand characteristic set with a defined offline resource set to acquire offline resource information corresponding to the user demand characteristic set.

By a technical means of mining offline resources according to user search log information, the embodiments of the present disclosure can solve technical problems in the existing solutions for extracting a merchant resource, which include incompleteness of analysis dimensions, one-sidedness of data sources and bad timeliness of data; and a serious waste of perceptions of actual consumer users and neglect on actual consumption demands of users. The present disclosure makes the finally mined offline resource fully take into account actual demands of online users directly fed back by search behaviors of the users. Moreover, the offline resource is acquired by mining user search logs, which can achieve the improvement of a coverage rate of the O2O platform to the offline resource, and the improvement of user satisfaction with the O2O platform and user experience, by fully using resources of big data.

DETAILED DESCRIPTION OF EMBODIMENTS

Specific embodiments of the present disclosure will be further described below in detail in combination with the accompanying drawings, in order to make objectives, technical solutions and advantages of the present disclosure clearer. It should be appreciated that the specific embodiments described herein are merely used for explaining the relevant invention, rather than limiting the invention.

In addition, it should be noted that, for the ease of description, only the parts related to the relevant invention are shown in the accompanying drawings. Before exemplary embodiments are discussed in more detail, it should be noted that some exemplary embodiments are described as processes or methods depicted as flowcharts. Although the flowcharts describe the operations (or steps) as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

First Embodiment

Figure 1:
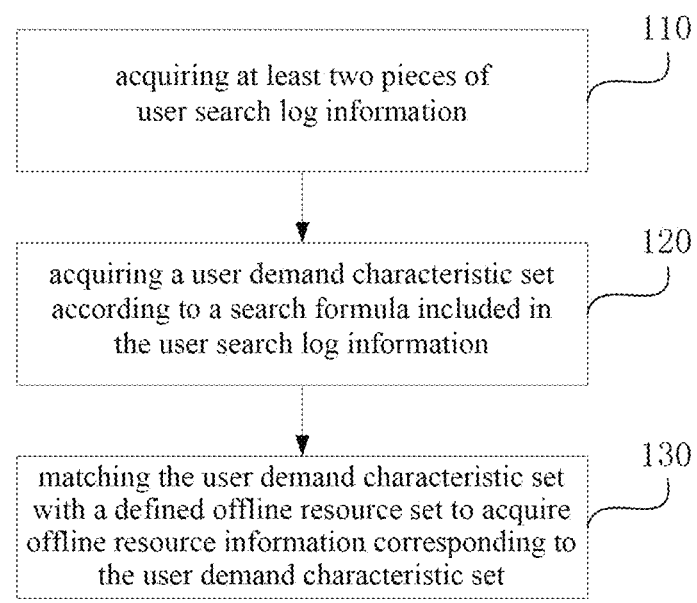
FIG. 1 is a flowchart of a method for mining offline resources according to a first embodiment of the present disclosure.

FIG. 1 is a flowchart of a method for mining offline resources according to a first embodiment of the present disclosure. The method of this embodiment may be performed by an apparatus for mining offline resources. This apparatus may be implemented by way of hardware and/or software, and may be generally integrated in a server. Typically, the server may preferably be a server of an O2O platform (e.g., Baidu Nuomi, etc.), and may also be a server of a third party service provider providing services of mining offline resources to the O2O platform, which is not limited by this embodiment. Meanwhile, the method of this embodiment is suitable for a situation where offline resources which may cooperate on line is mined for the O2O platform.

The method of this embodiment includes the following steps.

In step 110, at least two pieces of user search log information are acquired.

In this embodiment, it is a creative proposition that the offline resource which may cooperate on line is mined for the O2O platform according to general search behaviors of a user. Accordingly, it is required that the user search log information corresponding to the search behaviors of the user is first acquired.

In general, when the user is searching for information through a search engine, a server of the search engine or a local client of the user will save the user search log information recording the search behaviors of the user. Therefore, the user search log information may be acquired from the server of the search engine, and may also be acquired from a plurality of user clients, which is not limited by this embodiment.

Clearly, it should be appreciated by those skilled in the art that, in addition to searching for interesting offline resources in the search engine, the user can search for the offline resources through other platforms acquiring online resources (typically, a post bar, a forum, the O2O platform, etc.). Accordingly, in addition to the search engine, the user search log information may be acquired though the other platforms acquiring online resources, which is not limited by this embodiment.

In step 120, a user demand characteristic set is acquired according to a search formula included in the user search log information.

In general, the search log information records the search formula inputted by the user. The search formula refers to one or more query words, phrases, sentences, etc., which is inputted by the user through search information input windows of the platforms acquiring online resources. It should be appreciated that, offline resource information interested by the user is closely related to the search formula inputted by the user.

Accordingly, after the search formula inputted by the user is acquired, the user demand characteristic set may be acquired through certain data processes.

In this embodiment, the user demand characteristic set includes at least one keyword set. Meanwhile, the keyword set includes at least one keyword.

In a specific example, it is possible that search frequencies of various acquired search formulas are counted, and then word segmentation is performed on various search formulas, to directly assign a segmented word among various segmented words that has a search frequency above a defined search frequency threshold as a keyword set in the user demand characteristic set; or a segmented word set corresponding to a search formula having a search frequency above the defined search frequency threshold is directly assigned as a keyword in the user demand characteristic set.

For instance, if the acquired search formula includes: 1800 pieces of "Xiabu Xiabu at Haidian Huangzhuang", 700 pieces of "Xiabu Xiabu hotpot restaurant" and 600 pieces of "Xiabu Xiabu in Haidian District", after the word segmentation is performed on the three search formula, it is determined that there appears 3100 pieces of "Xiabu Xiabu", 1800 pieces of "Haidian Huangzhuang", "600" pieces of Haidian District. If the defined threshold of the search frequency is 1500, "Xiabu Xiabu" and "Haidian Huangzhuang" may be respectively served as a keyword set in the user demand characteristic set; or since "Xiabu Xiabu at Haidian Huangzhuang", as a search formula, appears above 1500 times, a segmented word set {Xiabu Xiabu and Haidian Huangzhuang} corresponding to a set segmenting result of this search formula may be directly assigned as a keyword set in the user demand characteristic set.

In another specific example, it is taken into account that different search formulas inputted by the user may correspond to the same search demand, after the search frequencies of various acquired search formulas are first counted, it is possible that the word segmentation is performed on various search formulas, segmented word sets corresponding to the search formulas are generated, at least two segmented word sets having a similarity above a defined threshold of similarity are merged into a new segmented word set after a similarity between every two segmented word sets is calculated, a search frequency of the new segmented word set is determined according to the search frequencies corresponding to the search formulas, and a segmented word set having a search frequency above the threshold value of the search frequency is stored into the user demand characteristic set.

For the three search formulas as described in the previous example, if it is determined by calculating the similarity that a similarity between "Xiabu Xiabu at Haidian Huangzhuang" and "Xiabu Xiabu in Haidian District" is above the defined threshold of the similarity, a new segmented word set {Xiabu Xiabu, Haidian Huangzhuang and Haidian District} may be generated, and a search frequency of this new segmented word set is determined as 1800+600=2400. Since the search frequency of this segmented word set is above 1500, the segmented word set {Xiabu Xiabu, Haidian Huangzhuang and Haidian District} may be assigned as a keyword in the user demand characteristic set.

In another specific example, to further enlarge a number of offline resources which are finally mined, after the segmented word set is acquired, clustering may be performed on each segmented word in the segmented word set, to assign a cluster keyword generated after the cluster process as the keyword set in the user demand characteristic set.

For the three search formulas as described in the previous example, after the new segmented word set {Xiabu Xiabu, Haidian Huangzhuang and Haidian District} is generated, the cluster process may be performed on each segmented word in this segmented word set and a preset brand set, and thus, it is finally determined that the segmented word "Xiabu Xiabu" is consistent with a preset brand "Xiabu Xiabu". Accordingly, a cluster keyword "Xiabu Xiabu" generated by the above clustering result may be assigned as the keyword set in the user demand characteristic set.

Clearly, it should be appreciated by those skilled in the art that, the user demand characteristic set corresponding to the search formulas may be acquired by other ways, which should not limited by this embodiment.

In step 130, the user demand characteristic set is matched with a defined offline resource set, to acquire offline resource information corresponding to the user demand characteristic set.

In this embodiment, the offline resource may specifically include off line brick-and-wall merchants, such as "XX" hotpot restaurant, "XX" hotel, "XX" cinema, "XX" KTV or "XX" playground which the user needs to arrive in to acquire offline services, and offline service providers, such as an entity or an non-brick-and-wall merchant like "XX" takeaway or "XX" delivery which may provide defined offline services to the user.

In this embodiment, the defined offline resource set is pre-stored in the server. The offline resource set may be acquired by ways of scraping in real time by a web crawler or autonomously reporting by the merchants, which is not limited by this embodiment.

The offline resource information corresponding to the user demand characteristic set may be acquired by means of a defined matching of keywords.

By taking a technical method of mining the offline resource according to the user search log information, the embodiment of the present disclosure can solve technical problems in the existing solutions for extracting a merchant resource, which include incompleteness of analysis dimensions, one-sidedness of data sources and bad timeliness of data; and a serious waste of perceptions of actual consumer users and neglect on actual consumption demands of users. The embodiment of the present disclosure can make the finally mined offline resource fully take into account actual demands of online users directly fed back by search behaviors of the users. Moreover, the offline resource is acquired by mining user search logs, which can achieve the improvement of a coverage rate of the O2O platform to the offline resource and the improvement of user satisfaction with the O2O platform and user experience by fully using resources of big data.

On the basis of the embodiment, the offline resource information may preferably include information of an offline brick-and-wall merchant.

In this embodiment, the following application scenario is taken into account. In real life, a new brick-and-wall merchant appears. Since its influence range is small, it cannot be quickly known by most people and is merely transmitted in a small range. If the existing solutions for extracting the merchant resource are used, the O2O platform will be incapable of quickly acquiring this merchant resource, and building an online cooperation relationship with this merchant in time. Specifically, if the brick-and-wall merchant has a lot of high scores, a user liking high scores cannot acquire promotion information of this brick-and-wall merchant through the O2O platform, thereby affecting usage experience of the user on the O2O platform. However, by using the method according to this embodiment, as long as a number of searches for this brick-and-wall merchant of the user exceeds a set threshold number, the server can mine information of this brick-and-wall merchant, which can achieve a rapid and timely online cooperation with a newborn brick-and-wall merchant, so as to improve a coverage rate of the O2O platform to the offline resource and improve user satisfaction with the O2O platform.

In an another specific application scenario, within a certain time period, the O2O platform terminates the online cooperation with an brick-and-wall merchant due to some reasons (e.g., quality of services of the merchant cannot meet demands of users in a certain time period). However, as time goes on, since the merchant adopts some strategies and takes some steps to change itself, and reacquires approvals of users, the O2O platform may quickly acquire the information of the brick-and-wall merchant and may select to once again cooperate with this brick-and-wall merchant on line through the method according to this embodiment, resulting in fast response, good timeliness and good user experience.

Second Embodiment

Figure 2:
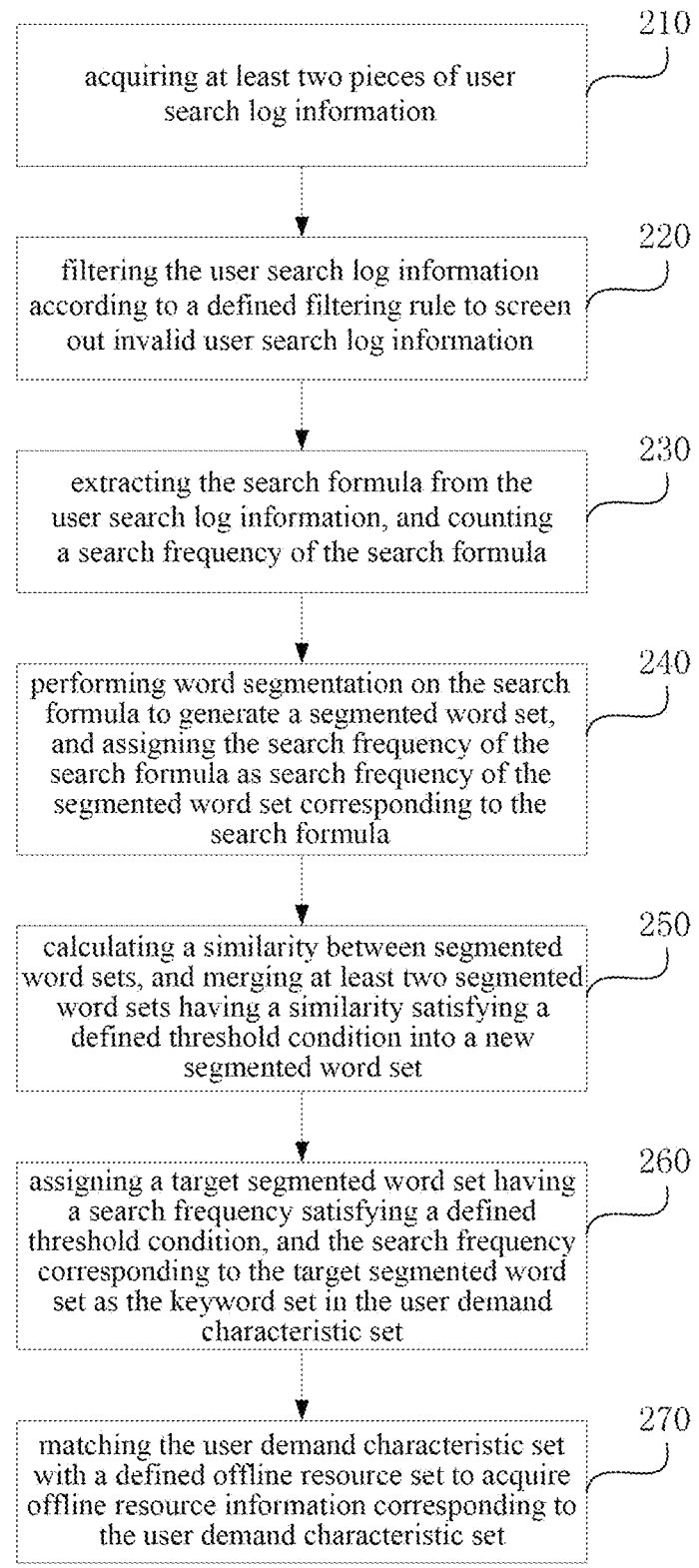
FIG. 2 is a flowchart of a method for mining offline resources according to a second embodiment of the present disclosure.

FIG. 2 is a flowchart of a method for mining offline resources according to a second embodiment of the present disclosure. This embodiment is optimized on the basis of the above embodiment. In this embodiment, the acquiring a user demand characteristic set according to a search formula included in the user search log information is optimized to includes: extracting the search formula from the user search log information, and counting a search frequency of the search formula; performing word segmentation on the search formula to generate a segmented word set corresponding to the search formula, and assigning the search frequency of the search formula as search frequency of the segmented word set corresponding to the search formula; calculating a similarity between segmented word sets, merging at least two segmented word sets having a similarity satisfying a defined threshold condition into a new segmented word set, and determining a search frequency of the new segmented word set according to search frequencies of the segmented word sets merged into the new segmented word set; and assigning a target segmented word set having a search frequency satisfying a defined threshold condition, and the search frequency corresponding to the target segmented word set as the keyword set in the user demand characteristic set.

Meanwhile, before the extracting the search formula from the user search log information, and counting a search frequency of the search formula, the method further preferably includes: filtering the user search log information according to a defined filtering rule, to screen out invalid user search log information.

Accordingly, the method according to this embodiment includes the following steps.

In step 210, at least two pieces of user search log information are acquired.

In step 220, the user search log information is filtered according to a defined filtering rule, to screen out invalid user search log information.

In this embodiment, it is taken into account that a number of user search logs generated in real time is very large, in which there is useful information that may be used to mine the offline resource, and also some useless interference information. If a data process is directly performed on the user search log information without data filtering (or data cleaning), precious processing resources of the CPU (Central Processing Unit) will be wasted.

In this embodiment, to make the CPU to mine data merely for valid user search logs, preferably, the user search log information is first filtered according to the defined filtering rule.

The filtering rule may include at least one of:

a historical filtering rule, an anti-pornography filtering rule, a blacklist filtering rule and a filtering rule for a non-user log.

Clearly, the following operations should be appreciated. Besides first filtering the user search log information and then extracting the search formula in the filtered user search log information, it is also possible that the search formula is first extracted from the user search log information, and the extracted search formula is then filtered, which are not limited by this embodiment.

In step 230, the search formula is extracted from the user search log information, and the search frequency of the search formula is counted.

In this embodiment, in consideration of real time of the generation of the user search log information, when the user search log information is acquired, user search log information in a set time interval is acquired, for example, the user search log information is acquired by using an hour, a day or a week as a unit. Accordingly, in order to mine offline resources interesting most people, search numbers of different search formulas in the set time interval (i.e., search frequencies) need to be counted.

In step 240, word segmentation is performed on the search formula to generate the segmented word set corresponding to the search formula, and the search frequencies of the search formula are assigned as the search frequencies of the segmented word sets corresponding to the search formula.

In this embodiment, the word segmentation performed on the search formula mainly indicates that words in the search formula is segmented to express the search formula with a segmented word as a unit. The word segmentation performed on the search formula may be completed by using a word segmentation algorithm based on a dictionary matching with a word library, a word segmentation algorithm based on word frequency statistics, or a word segmentation algorithm based on understanding of knowledge, which is not limited by this embodiment.

In this embodiment, after the word segmentation is completed, various words having no mining significances among the segmented words will be simultaneously removed, for example, conjunctions, subject terms, prepositions, etc., to further reduce a number of segmented words in the segmented word sets.

In a specific example, one search formula is "Xiabu Xiabu at Haidian Huangzhuang", and a search frequency of this search formula on Feb. 21, 2016 is obtained as 1600 times by counting. After a segmented word set {Haidian Huangzhuang and Xiabu Xiabu} is obtained by performing the word segmentation on this search formula, the search frequency of this search formula "Xiabu Xiabu at Haidian Huangzhuang" is served as a search frequency of the segmented word set {Haidian Huangzhuang and Xiabu Xiabu}. That is, the search frequency of the segmented word set {Haidian Huangzhuang and Xiabu Xiabu} is 1600 times.

In step 250, the similarity between segmented word sets is calculated, at least two segmented word sets having a similarity satisfying the defined threshold condition are merged into a new segmented word set, and a search frequency of the new segmented word set is determined according to search frequencies of the segmented word sets merged into the new segmented word set.

As described above, it is taken into account that different search formulas inputted by different users may correspond to the same search demand, and accordingly, it is possible that a similarity between different segmented word sets is first calculated, and the at least two segmented word sets having the similarity satisfying the defined threshold condition are merged into the new segmented word set.

Preferably, a similarity between every two segmented word sets may be calculated through a VSM (Vector space model) algorithm.

In a specific example, if a similarity between the segmented word set {Xiabu Xiabu and Haidian Huangzhuang} and a segmented word set {Xiabu Xiabu and Haidian District} satisfies the defined threshold condition, the two segmented word sets can be merged into a new segmented word set {Xiabu Xiabu, Haidian Huangzhuang and Haidian District}.

If a search frequency of the segmented word set {Xiabu Xiabu and Haidian Huangzhuang} is 1000 times, and a search frequency of the segmented word set {Xiabu Xiabu and Haidian District} is 800 times, it can be determined that a search frequency of the new segmented word set {Xiabu Xiabu, Haidian Huangzhuang and Haidian District} is 1800 times by adding 1000 to 800.

In step 260, a target segmented word set having a search frequency satisfying a defined threshold condition and the search frequency corresponding to the target segmented word set are assigned as a keyword set in the user demand characteristic set.

As described in the previous example, if the defined threshold condition is 1500, {Xiabu Xiabu, Haidian Huangzhuang and Haidian District} is determined as the target segmented word set satisfying the defined threshold condition, and (Xiabu Xiabu, Haidian Huangzhuang and Haidian District} and 1800) may be assigned as the keyword in the user demand characteristic set.

In step 270, the user demand characteristic set is matched with a defined offline resource set, to acquire offline resource information corresponding to the user demand characteristic set.

In this embodiment, after a word segmentation is performed on the search formula extracted from user search logs and segmented word sets corresponding to the search formula are generated, a similarity between every two segmented word sets is calculated, at least two segmented word sets having a similarity satisfying a defined threshold condition are merged into a new segmented word set, and a target segmented word set having a search frequency satisfying a defined threshold condition is assigned as a keyword in a user demand characteristic set, accurate classification for different search formulas corresponding to the same search demand is achieved by a way of calculating a similarity, under the premise of some differences between the search formulas inputted by the user, which makes the finally mined offline resource respond actual search demands of users more accurately.

Third Embodiment

Figure 3:
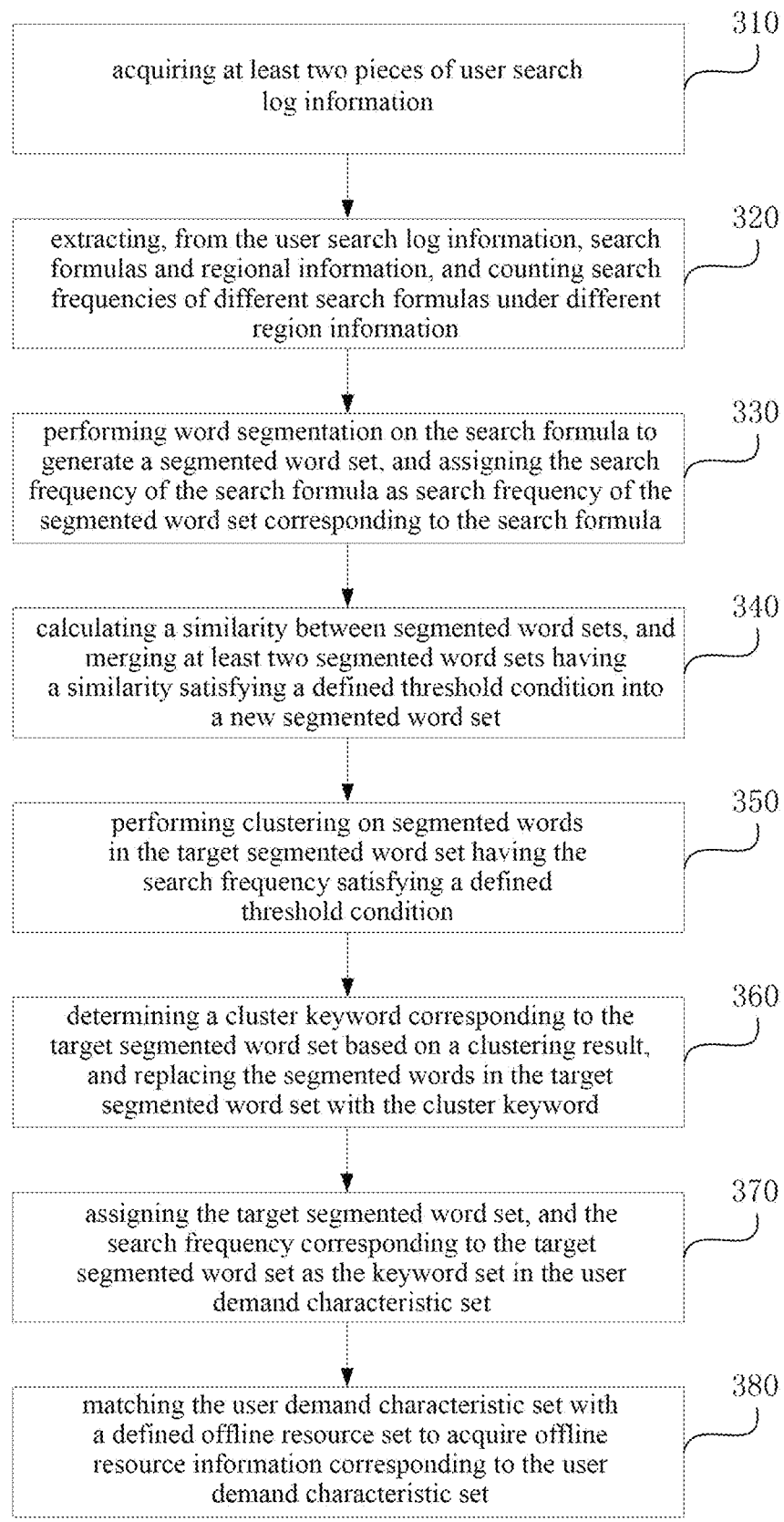
FIG. 3 is a flowchart of a method for mining offline resources according to a third embodiment of the present disclosure.

FIG. 3 is a flowchart of a method for mining offline resources according to a third embodiment of the present disclosure. This embodiment is optimized on the basis of the above embodiments. In this embodiment, on the basis of the above embodiments, the acquiring a user demand characteristic set according to a search formula included in the user search log information is optimized to include: extracting the search formula from the user search log information, and counting a search frequency of the search formula; performing word segmentation on the search formula to generate a segmented word set corresponding to the search formula, and assigning the search frequency of the search formula as search frequency of the segmented word set corresponding to the search formula; calculating a similarity between segmented word sets, merging at least two segmented word sets having a similarity satisfying a defined threshold condition into a new segmented word set, and determining a search frequency of the new segmented word set according to search frequencies of the segmented word sets merged into the new segmented word set; performing clustering on a segmented word in the target segmented word set having the search frequency satisfying the defined threshold condition; determining a cluster keyword corresponding to the target segmented word set based on a clustering result, and replacing the segmented words in the target segmented word set with the cluster keyword; and assigning the target segmented word set and the search frequency corresponding to the target segmented word set as the keyword set in the user demand characteristic set.

Meanwhile, while the search formula is extracted from the user search log information, the method further preferably include: extracting, from the user search log information, regional information corresponding to the search formula. Accordingly, the counting for search frequencies corresponding to different search formulas is optimized to include: counting search frequencies of different search formulas using different pieces of regional information.

Accordingly, the method of this embodiment includes the following steps.

In step 310, at least two pieces of user search log information are acquired.

In step 320, regional information corresponding to the search formula is extracted from the user search log information, and search frequencies of different search formulas using different pieces of regional information are counted.

In general, besides the search formula inputted by a user, the user search log information includes the regional information corresponding to a position of the user.

The regional information may include: country information, city information, city area information or commercial area information.

In this embodiment, regional characteristics of offline resources are taken into account, for example, "XX" chain restaurant in "XX" city, which obtains a good reputation from users due to rapid development of franchisees, and accordingly, a lot of users in this city starts to search for this chain restaurant in the Internet. It should be appreciated that, if regional information of the users is simultaneously acquired while this chain restaurant, as the offline resource, is mined, and the search frequencies of different search formulas using different pieces of regional information are counted, a final mining result can get closer to actual results of the users, resulting in a better mining effect.

In step 330, word segmentation is performed on the search formula to generate a segmented word set corresponding to the search formula, and the search frequency of the search formula is assigned as search frequency of the segmented word set corresponding to the search formula.

As described above, the search frequencies of the segmented word sets may be search frequencies using different pieces of regional information, for example, Xiabu Xiabu: Beijing 3457 times, Tianjin 1230 times, etc.

In step 340, a similarity between segmented word sets is calculated, at least two segmented word sets having a similarity satisfying a defined threshold condition are merged into a new segmented word set, and a search frequency of the new segmented word set is determined according to search frequencies of the segmented word sets merged into the new segmented word set.

In step 350, clustering is performed on a segmented word in a target segmented word set having a search frequency satisfying a defined threshold condition.

In this embodiment, the search frequency satisfying the defined threshold condition may be a search frequency under a certain piece of the regional information that is above the defined threshold condition.

As described above, to further enlarge a number of offline resources which are finally mined, a corresponding user demand characteristic set may be generated after the cluster process is performed on the segmented word in the acquired segmented word set.

The purpose of the clustering is to perform a certain upper process on specific offline resources which are mined, to enlarge the number of the mined offline resources, so as to improve a recall rate of data.

For example, a segmented word set {Xiabu Xiabu and Haidian Huangzhuang} satisfying the defined threshold condition is acquired after a similarity is calculated. If this segmented word set is directly assigned as the user demand characteristic set to match with an offline resource set, the brick-and-wall merchant Xiabu Xiabu Haidian Huangzhuang should be acquired (or recalled) in theory. However, it is taken into account that the offline resource set may not be this kind of specific merchant name, and accordingly, a recall rate of actual data will be lower if such a specific or lower segmented word set is assigned as the user demand characteristic set. Meanwhile, the number of the brick-and-wall merchants which are finally mined will be fewer in this data mining method.

In the method according to this embodiment, in consideration of specific problems in the actual operations, an operation of the cluster process is added after the segmented word set is acquired. Specifically, the clustering is performed on the acquired segmented word set and a set brand set. If the segmented word set can be clustered to a brand name in the brand set, the brand name is directly assigned as the user demand characteristic set to solve the above two practical problems.

In a preferable implementation of this embodiment, the cluster process may be performed on the segmented word in the acquired segmented word set by a K-means hard clustering algorithm.

In step 360, a cluster keyword corresponding to the target segmented word set is determined based on a clustering result, and the segmented words in the target segmented word set are replaced with the cluster keyword.

In a preferable implementation of this embodiment, if the target segmented word set can be clustered to a set brand name, or a cluster keyword, the brand name or the cluster keyword can be used to directly replace all segmented words in the target segmented word set.

Accordingly, if the target segmented word set cannot be clustered to a cluster keyword, all the segmented words in the target segmented word set are kept.

In step 370, the target segmented word set and the search frequency corresponding to the target segmented word set are assigned as a keyword set in the user demand characteristic set.

In a preferable implementation of this embodiment, the segmented word in the target segmented word set and a search frequency of the clustered segmented word set under the regional information can be served as the keyword set in the user demand characteristic set.

For instance, a keyword set in a user demand characteristic set after the clustering includes: (Xiabu Xiabu, Beijing and 3457).

In step 360, the user demand characteristic set is matched with a defined offline resource set, to acquire offline resource information corresponding to the user demand characteristic set.

In the method according to this embodiment, by counting the search frequencies of different search formulas using different pieces of regional information, the finally mined offline resources get closer to actual results of online users, resulting in a better mining effect. Meanwhile, a number of mined offline resources is enlarged and a recall rate of data is improved by an operation of adding a clustering process after a segmented word set is acquired by calculating a similarity.

Fourth Embodiment

Figure 4:
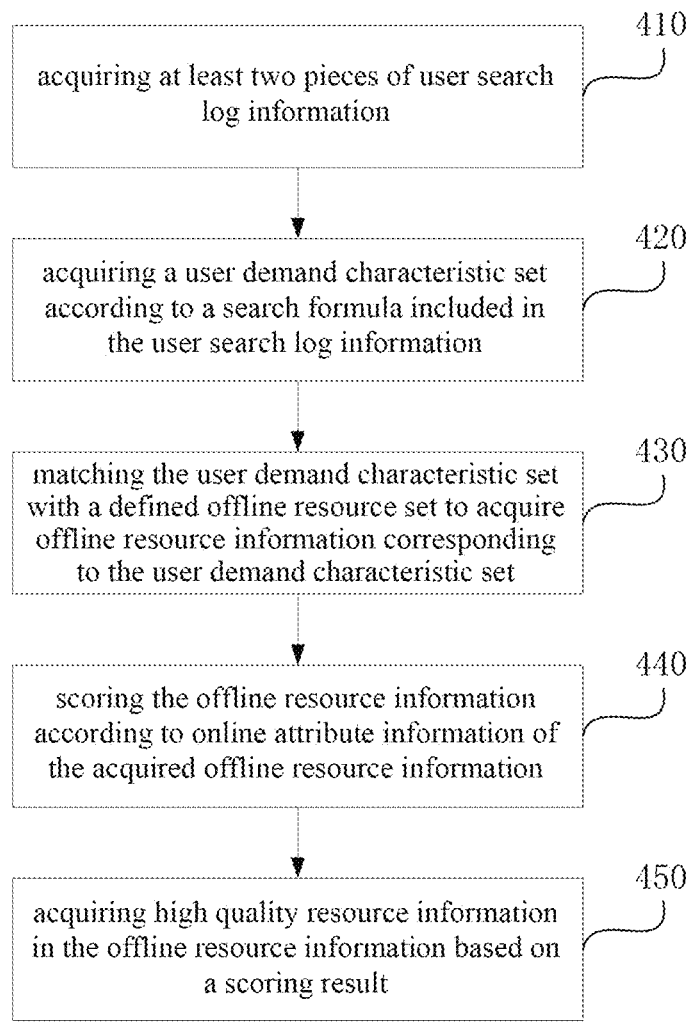
FIG. 4 is a flowchart of a method for mining offline resources according to a fourth embodiment of the present disclosure.

FIG. 4 is a flowchart of a method for mining offline resources according to a fourth embodiment of the present disclosure. This embodiment is optimized on the basis of the above embodiments. In this embodiment, after the matching the user demand characteristic with a defined offline resource set, to acquire offline resource information corresponding to the user demand characteristic set, the method further preferably includes: scoring the offline resource information according to online attribute information of the acquired offline resource information; and acquiring high quality resource information in the offline resource information according to a scoring result.

Accordingly, the method according to this embodiment includes the following steps.

In step 410, at least two pieces of user search log information are acquired.

In step 420, a user demand characteristic set is acquired according to a search formula included in the user search log information. The user demand characteristic set includes a keyword set.

In step 430, the user demand characteristic set is matched with a defined offline resource set, to acquire offline resource information corresponding to the user demand characteristic set.

In step 440, the offline resource information is scored according to online attribute information of the acquired offline resource information.

In this embodiment, it is taken into account that a larger number of mined offline resources is wished when the offline resources are finally mined. Since the certain upper process (the cluster process) is performed, and an inevitable problem after the upper process is that the finally offline resource may mix with offline resources disadvantageous to user experience or online cooperation, an operation of scoring the offline resource information is added after the offline resource information is acquired, to screen out offline resource information that is not suitable for online cooperation or visibly notate high quality offline resource information that may be given priority to cooperation.

In a preferable implementation of this embodiment, the online attribute information may include at least one of: completeness of online data of the offline resource (e.g., whether online address information, online merchant name information, online telephone information and other online information of an brick-and-wall merchant are complete), a ranking value of online user evaluation for the offline resource, and a frequency of the offline resource appearing in user search logs.

Clearly, it should be appreciated by those skilled in the art that the offline resource information may also be scored by adopting other online attribute information, which is not limited by this embodiment.

In step 450, high quality resource information in the offline resource information is acquired according to a scoring result.

In this embodiment, a scoring threshold value may be set, and offline resource information having a scoring value above the scoring threshold value is served as the high quality resource information.

By a technical means of scoring the offline resource information according to online attribute information of the acquired offline resource information and acquiring high quality resource information in the offline resource information according to a scoring result, the method according to this embodiment can achieve an effect of filtering out the offline resource information that is not suitable for online cooperation, or visibly notating the high quality offline resource information that may be given priority to cooperation, to optimize a final result of mining the offline resources, so as to improve a hit rate of a finally selected online cooperation object on an actual demand of a user, and improve usage experience of the user on an O2O platform.

On the basis of the above embodiments, the method according to this embodiment may further includes:

storing the acquired user demand characteristic set, and the offline resource information corresponding to the user demand characteristic set; and adding a defined attribute label into the high quality resource information and/or the offline resource information satisfying a defined condition for getting online.

In this embodiment, to better perform processing or a data analysis according to the mined offline resource, the acquired user demand characteristic set and the offline resource information corresponding to the user demand characteristic set are preferably stored.

Further, the high quality resource information in the mined offline resource information, or the offline resource information satisfying the defined condition for getting on line (e.g., a mined "XX" hotel once built an online cooperation relationship with the O2O) may be labeled, to prompt subsequent salespeople (people who discuss online cooperation with the brick-and-wall merchant).

On the basis of the above embodiments, the method according to this embodiment may further includes:

assigning a time interval having a defined time span as a basic time unit; acquiring, in real time, user demand characteristic sets in different basic time units and the offline resource information corresponding to the user demand characteristic sets; and storing the user demand characteristic sets and the offline resource information corresponding to the user demand characteristic sets by using time as a dimension, to achieve a mining effect evaluation for the acquired offline resource information.

Typically, the offline resource information mined by the method of this embodiment is offline resource information within a set time interval (e.g., on Feb. 21, 2016). Accordingly, to achieve the mining effect evaluation for the acquired offline resource information, the offline resource information may be preferably mined by using a day as a time dimension, and mined merchant information, a mining trend, a daily mining number of merchants and so on are stored after every time of mining. The merchant information includes an address, telephone, classification, brand and other information of a merchant. The mining effect evaluation to the offline resource information is achieved by searching or these mining results.

On the basis of the above embodiments, the method according to this embodiment may further includes:

acquiring an online resource in the stored offline resource information; and monitoring the online resource in real time and evaluating an online effect for the online resource.

Preferably, after discussing with the offline brick-and-wall merchant corresponding to the mined offline resource information, a certain number of offline resources may be converted to on line resources. To evaluate the online effect for the offline resource mined by the method according this embodiment, preferably, the evaluation of the online effect for the online resource may be achieved by way of acquiring an online resource in the stored offline resource information and monitoring the online resource in real time (typically, earning statistics of the online resource or change of turnovers, etc.), and the effectiveness of the method for mining offline resources is verified in reverse according to the evaluation result.

FIGS. 5a-5e are schematic diagrams of a specific application scenario of the method for mining offline resources according to the fourth embodiment of the present disclosure.

Figure 5A:
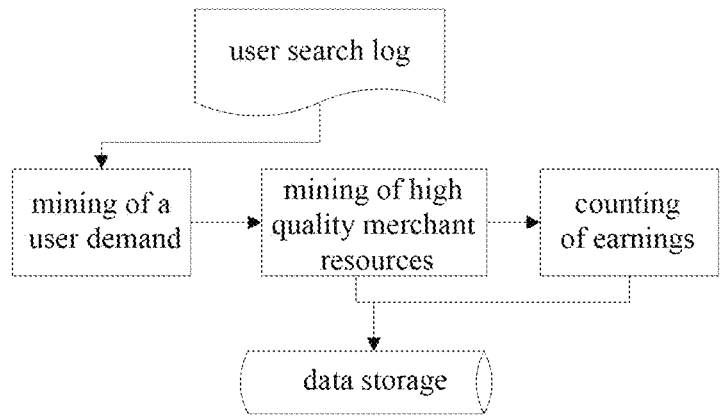
FIGS. 5a-5e are schematic diagrams of a specific application scenario of the method for mining offline resources according to the fourth embodiment of the present disclosure.

As shown in FIG. 5a, the specific application scenario according to this embodiment includes the following operations: mining a user demand according to a user search log; mining a high quality merchant resource according to a mining result of the user demand; counting earnings for an online cooperative merchant generated according to a mining result; and storing data for the mined high quality merchant resource and an earning counting result.

Figure 5B:
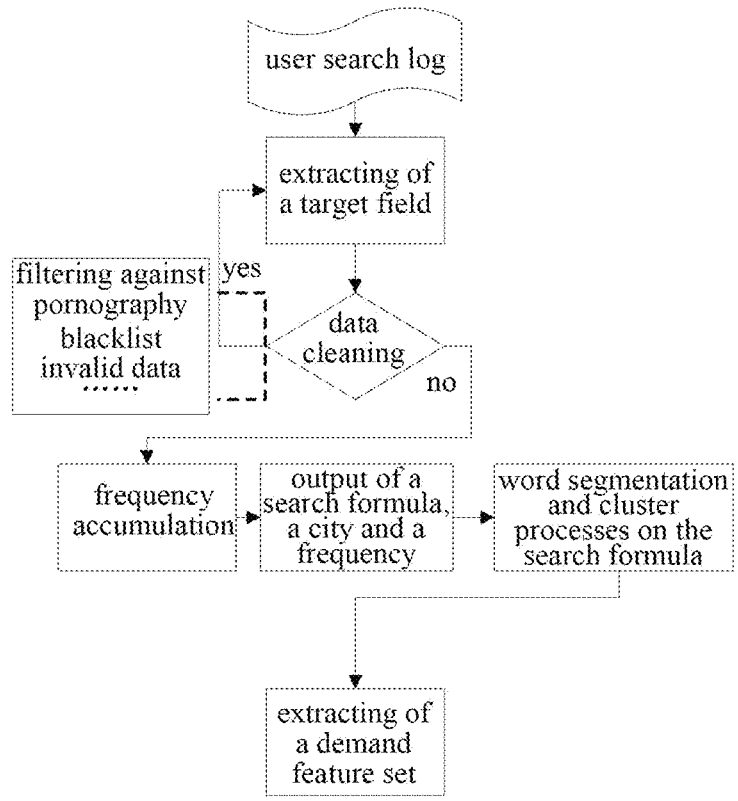

Specifically, a specific operation process of mining the user demand according to the user search log and acquiring the user demand characteristic set is shown in FIG. 5b. That is, a target field (i.e., a search formula) is first extracted according to user search log information, and data cleaning is performed on the extracted target field. If it is determined that the target field satisfies a data cleaning condition (i.e., satisfies a filtering condition against pornography, a blacklist filtering condition or belongs to invalid data, etc.), this target field will be cleaned and filtered out. Otherwise, a frequency of the target field will be accumulated. After all processes for the use search log are completed, the output of the search formula, city and frequency is implemented at last. A demand characteristic set is finally generated after word segmentation and cluster are performed on the search formula.

Figure 5C:
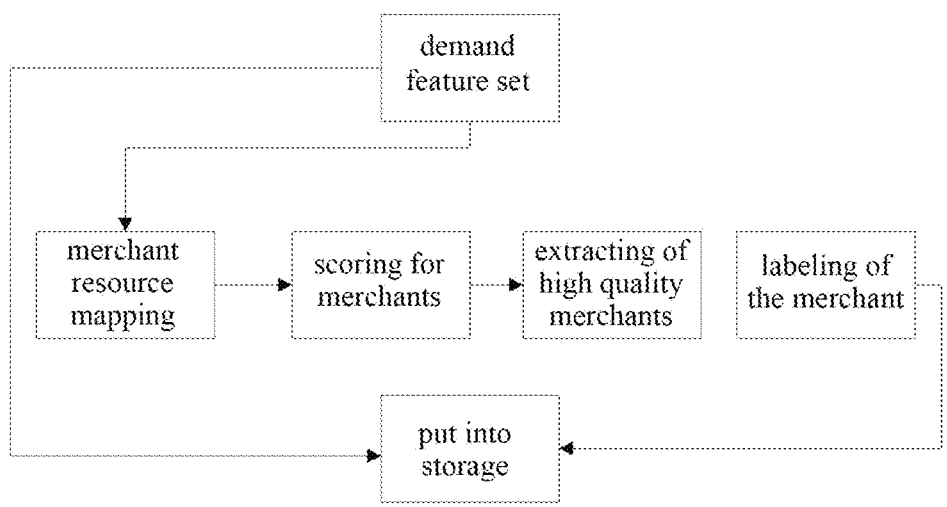

Specifically, a specific operation process of mining the high quality merchant resource according to the mining result of the user demand is shown in FIG. 5c. That is, first, merchant resource mapping is performed on the demand characteristic set. Next, merchants generated by mapping are scored and a high quality merchant is extracted. Then, a merchant satisfying a defined condition is labeled. Finally, the demand characteristic set and the labeled merchant are finally put into storage.

Figures 5D, 5E:
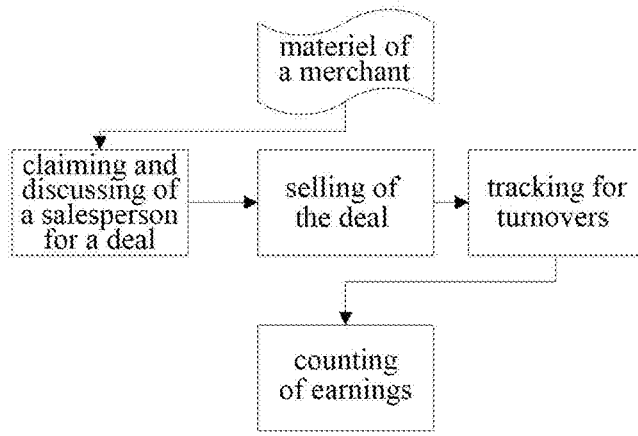

Specifically, a specific operation process of counting earnings for the merchant put into storage is shown in FIG. 5d. That is, a partition process is performed on a merchant resource put into storage, and salespeople in different partitions claim merchant clues, cooperate and make deals, and put corresponding circulation information into storage. For a cooperative merchant in merchant resources put into storage, changes of turnovers of group deals are tracked to implement the earning counting for the mined merchant.

Specifically, FIG. 5e is a schematic diagram of a query interface of the merchant put into storage. As shown in FIG. 5e, it can be found through queries that a user demand characteristic set put into storage includes a brand name "Xiabu Xiabu", regional information "Beijing" and a search frequency "1191".

Offline resource information corresponding to the user demand characteristic set is acquired by matching the user demand characteristic set with a defined offline resource set, and after the acquired offline resource information is scored, "store name", "store address", etc. listed in FIG. 5e are mined high quality merchant resources. "Public and private customer pools exist or not" and "online deal exists or not" are labels added according to industry needs.

Through the information query interface shown in FIG. 5e, a related personnel in the O2O platform responsible for discussing online cooperation with brick-and-wall merchants may query an brick-and-wall merchant which can discuss cooperation, according to a geographical position which the related personnel is responsible for, so as to make a hit rate of the final cooperative brick-and-wall merchant on the actual demand of the user better, and thus, usage experience of the user on the O2O platform can be improved.

Fifth Embodiment

Figure 6:
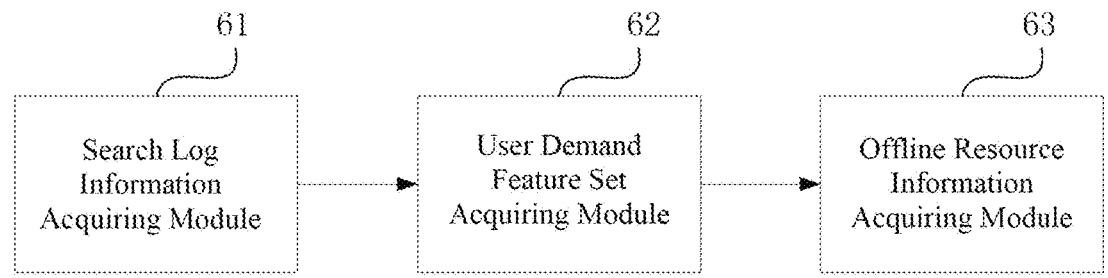
FIG. 6 is a structural diagram of an apparatus for mining offline resources according to a fifth embodiment of the present disclosure.

FIG. 6 is a structural diagram of an apparatus for mining offline resources according to a fifth embodiment of the present disclosure. As shown in FIG. 6, the apparatus includes:

a search log information acquiring module 61, configured to acquire at least two pieces of user search log information;

a user demand characteristic set acquiring module 62, configured to acquire a user demand characteristic set according to a search formula included in the user search log information, the user demand characteristic set including a keyword set; and an offline resource information acquiring module 63, configured to match the user demand characteristic set with a defined offline resource set to acquire offline resource information corresponding to the user demand characteristic set.

By a technical means of mining offline resources according to the user search log information, the embodiment of the present disclosure can solve technical problems in the existing solutions for extracting a merchant resource, which include incompleteness of analysis dimensions, one-sidedness of data sources and bad timeliness of data; and a serious waste of perceptions of actual consumer users and neglect on actual consumption demands of users, to make the finally mined offline resource fully take into account actual demands of online users directly fed back by search behaviors of the users. Moreover, the offline resource is acquired by mining user search logs, which can achieve the improvement of a coverage rate of the O2O platform to the offline resource, and the improvement of user satisfaction with the O2O platform and user experience, by fully using resources of big data.

On the basis of the above embodiments, the offline resource information may include information of an offline brick-and-wall merchant.

On the basis of the above embodiments, the user demand characteristic set acquiring module may include:

a first search formula extracting unit, configured to extract the search formula from the user search log information and count a search frequency of the search formula;

a first segmented word set generating unit, configured to perform word segmentation on the search formula to generate a segmented word set corresponding to the search formula, and assign the search frequency of the search formula as search frequency of the segmented word set corresponding to the search formula;

a first similarity merging unit, configured to calculate a similarity between the segmented word sets, merge at least two segmented word sets having a similarity satisfying a defined threshold condition into a new segmented word set, and determine a search frequency of the new segmented word set according to the search frequencies of the segmented word sets merged into the new segmented word set; and a first keyword set generating unit, configured to assign a target segmented word set having a search frequency satisfying a defined threshold condition, and the search frequency corresponding to the target segmented word set as the keyword set in the user demand characteristic set.

On the basis of the above embodiments, the user demand characteristic set acquiring module may include:

a second search formula extracting unit, configured to extract the search formula from the user search log information, and count a search frequency of the search formula;

a second segmented word set generating unit, configured to perform word segmentation on the search formula to generate a segmented word set corresponding to the search formula, and assign the search frequency of the search formula as search frequency of the segmented word set corresponding to the search formula;

a second similarity merging unit, configured to calculate the similarity between the segmented word sets, merge the at least two segmented word sets having the similarity satisfying the defined threshold condition into the new segmented word set, and determine the search frequency of the new segmented word set according to the search frequencies of the segmented word sets merged into the new segmented word set;

a cluster processing unit, configured to perform clustering on a segmented word in the target segmented word set having the search frequency satisfying the defined threshold condition;

a segmented word replacing unit, configured to determine a cluster keyword corresponding to the target segmented word set based on a clustering result, and replace the segmented words in the target segmented word set with the cluster keyword; and a second keyword set generating unit, configured to assign the target segmented word set, and the search frequency corresponding to the target segmented word set as the keyword set in the user demand characteristic set.

On the basis of the above embodiments, the apparatus may further include a log filtering module. The log filtering module is configured to filter the user search log information according to a defined filtering rule to screen out invalid user search log information, before the search formula is extracted from the user search log information and the search frequencies of the search formula is counted.

The filtering rule includes at least one of:

a historical filtering rule, an anti-pornography filtering rule, a blacklist filtering rule and a filtering rule for a non-user log.

On the basis of the above embodiments, the apparatus may further include a regional information extracting module. The regional information extracting module is configured to extract, from the user search log information, regional information corresponding to the search formula, while the search formula is extracted from the user search log information.

The regional information includes: country information, city information, city area information or commercial area information.

Accordingly, the first search formula extracting unit or the second search formula extracting unit may be further configured to count search frequencies of different search formulas using different pieces of regional information.

On the basis of the above embodiments, the apparatus may further include a high quality resource information acquiring module, configured to score the offline resource information according to online attribute information of the acquired offline resource information, after the user demand characteristic set is matched with the defined offline resource set to acquire the offline resource information corresponding to the user demand characteristic set; and acquire high quality resource information in the offline resource information according to a scoring result.

The online attribute information includes at least one of:

completeness of online data of the offline resource, a ranking value of online user evaluation for the offline resource, and a frequency of the offline resource appearing in user search logs.

On the basis of the above embodiments, the apparatus may further include a storage module. The storage module is configured to store the acquired user demand characteristic set, and the offline resource information corresponding to the user demand characteristic set; and add a defined attribute label into the high quality resource information and/or the offline resource information satisfying a defined condition for getting online.

On the basis of the above embodiments, the apparatus may further include a counting module. The counting module is configured to assign a time interval having a defined time span as a basic time unit;

acquire, in real time, user demand characteristic sets in different basic time units and the offline resource information corresponding to the user demand characteristic sets; and store the user demand characteristic sets and the offline resource information corresponding to the user demand characteristic sets by using time as a dimension, to achieve a mining effect evaluation for the acquired offline resource information.

On the basis of the above embodiments, the apparatus may further include an online resource evaluating module. The online resource evaluating module is configured to acquire an online resource in the stored offline resource information; and monitor the online resource in real time, and evaluate an online effect for the online resource.

The apparatus for mining offline resources provided by the embodiment of the present disclosure may perform the method for mining offline resources provided by any embodiment of the present disclosure, and possess corresponding functional modules to achieve the same beneficial effects.

Apparently, it should be understood by those skilled in the art that the modules and steps of the present disclosure may be performed by the server described above. Alternatively, embodiments of the present disclosure may be implemented by an executable program if a computer device, and thus the embodiments can be stored into a storage device to be performed by a processor. The program may be stored into a computer readable storage medium. The storage medium may be a read-only memory, a magnetic disk or an optical disk, etc. The embodiments may also be implemented by respectively making themselves into various integrated circuit modules, or making a plurality of modules or steps in the embodiments into a single integrated circuit module. Accordingly, the present disclosure is not limited to any specific combination of hardware and software.

Figure 7:
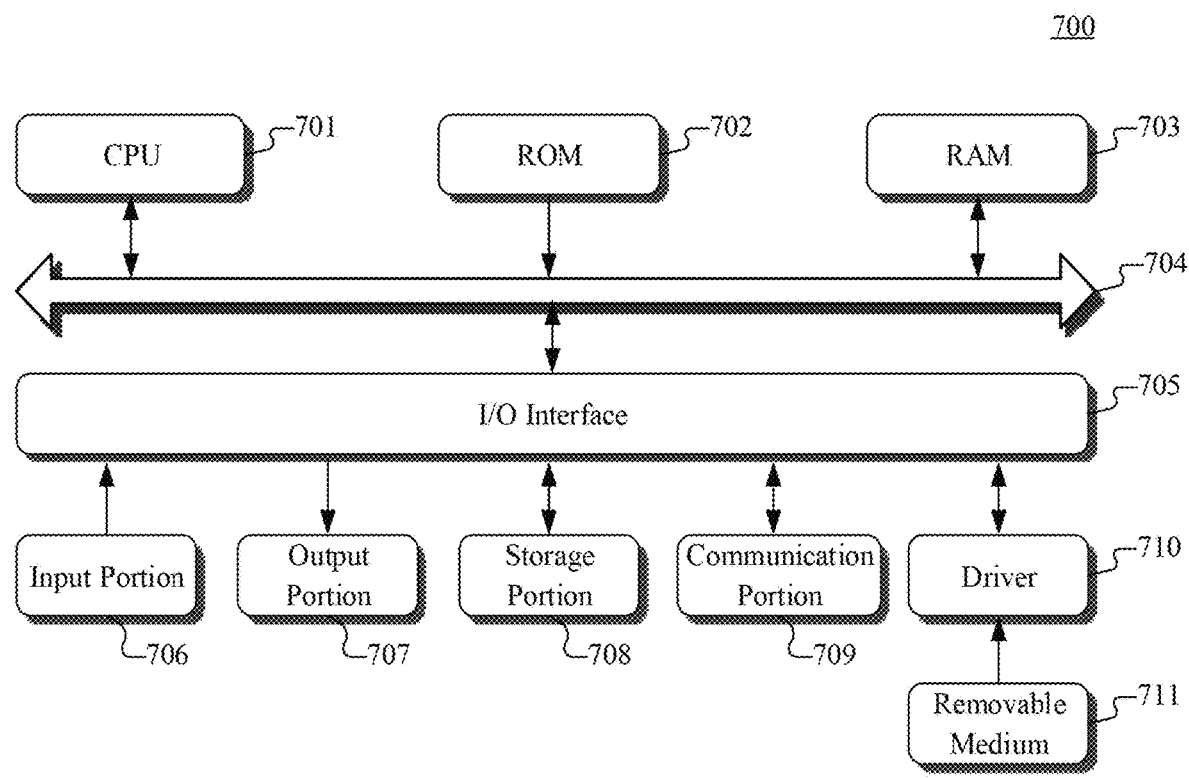
FIG. 7 is a schematic structural diagram of a computer system adapted to implement a terminal device or a server according to embodiments of the present disclosure.

Referring to FIG. 7, a schematic structural diagram of a computer system 700 adapted to implement a server of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may appear in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire at least two pieces of user search log information; acquire a user demand characteristic set according to a search formula included in the user search log information, the user demand characteristic set including a keyword set; and match the user demand characteristic set with a defined offline resource set to acquire offline resource information corresponding to the user demand characteristic set.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for mining offline resources, comprising:
  acquiring at least two pieces of user search log information;
  acquiring a user demand characteristic set according to a search formula included in the user search log information, the user search log information recording search behaviors of the user, the user demand characteristic set including a keyword set, wherein the acquiring the user demand characteristic set according to the search formula included in the user search log information comprises steps of:
  i) extracting a plurality of search formulas from the user search log information, and counting respective search frequencies of the search formulas, wherein the plurality of search formulas comprises a first search formula including one or more first words and a second search formula including one or more second words, and the search frequencies comprise a first search frequency of the first search formula and a second search frequency of the second search formula;

ii) performing word segmentation on the search formulas to generate segmented word sets corresponding to the search formulas, and assigning the search frequencies of the search formulas as the search frequencies of the segmented word sets corresponding to the search formulas, wherein the segmented word sets comprise a first segmented word set including the one or more first words of the first search formula, and a second segmented word set including the one or more second words of the second search formula, wherein the assigning comprises assigning the first search frequency as a search frequency of the first segmented word set, and assigning the second search frequency as a search frequency of the second segmented word set;

iii) calculating a similarity between the first segmented word set and the second segmented word set, determining that the similarity satisfies a defined threshold condition, merging the first segmented word set and the second segmented word set into a new segmented word set including the one or more first words and the one or more second words, and determining a new search frequency as a search frequency of the new segmented word set, wherein the new search frequency equals a sum of the first search frequency and the second search frequency;

iv) determining that the new search frequency satisfies a defined threshold condition; and v) assigning the new segmented word set as the keyword set in the user demand characteristics set; and matching the user demand characteristic set with a defined offline resource set to acquire offline resource information corresponding to the user demand characteristic set, the defined offline resource set comprising information of an offline brick-and-wall merchant and information of an offline server provider, wherein the method is performed by at least one processor.

2. The method according to claim 1, wherein the offline resource information comprises the information of the offline brick-and-wall merchant.

3. The method according to claim 2, wherein the acquiring the user demand characteristic set according to the search formula included in the user search log information further comprises:

determining the new segmented word set as a target segmented word set;

performing clustering on segmented words in the target segmented word set having the search frequency satisfying the defined threshold condition;

determining a cluster keyword corresponding to the target segmented word set based on a clustering result, and replacing the segmented words in the target segmented word set with the cluster keyword; and assigning the target segmented word set, and the search frequency corresponding to the target segmented word set as the keyword set in the user demand characteristic set.

4. The method according to claim 1, wherein before step i), the acquiring the user demand characteristic set according to the search formula included in the user search log information further comprises:

filtering the user search log information according to a defined filtering rule to screen out invalid user search log information;

wherein the filtering rule comprises at least one of:

a historical filtering rule, an anti-pornography filtering rule, a blacklist filtering rule or a filtering rule for a non-user log.

5. The method according to claim 1, wherein the step i) comprises:

extracting, from the user search log information, regional information corresponding to each of the search formulas;

wherein the regional information comprises: country information, city information, city area information or commercial area information, and counting respective search frequencies of the search formulas comprises: counting respective search frequencies of the search formulas using different pieces of regional information.

6. The method according to claim 1, wherein after matching the user demand characteristic with the defined offline resource set, to acquire the offline resource information corresponding to the user demand characteristic set, the method further comprises:

scoring the offline resource information according to online attribute information of the acquired offline resource information; and acquiring high quality resource information in the offline resource information based on a scoring result;

wherein the online attribute information comprises at least one of:

completeness of online data of offline resource, a ranking value of online user evaluation for the offline resource, or a frequency of the offline resource appearing in user search logs.

7. The method according to claim 6, further comprising:

storing the acquired user demand characteristic set, and the offline resource information corresponding to the user demand characteristic set; and adding a defined attribute label into the high quality resource information and/or the offline resource information satisfying a defined condition for getting online.

8. The method according to claim 7, further comprising:

assigning a time interval having a defined time span as a basic time unit;

acquiring, in real time, user demand characteristic sets in different basic time units and the offline resource information corresponding to the user demand characteristic sets; and storing the user demand characteristic sets and the offline resource information corresponding to the user demand characteristic sets by using time as a dimension, to achieve a mining effect evaluation for the acquired offline resource information.

9. The method according to claim 7, further comprising:

acquiring an online resource in the stored offline resource information; and monitoring the online resource in real time, and evaluating an online effect for the online resource.

10. An apparatus for mining offline resources, comprising:

at least one processor; and a memory storing instructions, which when executed by the at least one processor, cause the at least one processor to perform operations, the operations comprising:

acquiring at least two pieces of user search log information;

acquiring a user demand characteristic set according to a search formula included in the user search log information, the user search log information recording search behaviors of the user, the user demand characteristic set including a keyword set, wherein the acquiring the user demand characteristic set according to the search formula included in the user search log information comprises steps of:

i) extracting a plurality of search formulas from the user search log information, and counting respective search frequencies of the search formulas, wherein the plurality of search formulas comprises a first search formula including one or more first words and a second search formula including one or more second words, and the search frequencies comprise a first search frequency of the first search formula and a second search frequency of the second search formula;

ii) performing word segmentation on the search formulas to generate segmented word sets corresponding to the search formulas, and assigning the search frequencies of the search formulas as the search frequencies of the segmented word sets corresponding to the search formulas, wherein the segmented word sets comprise a first segmented word set including the one or more first words of the first search formula, and a second segmented word set including the one or more second words of the second search formula, wherein the assigning comprises assigning the first search frequency as a search frequency of the first segmented word set, and assigning the second search frequency as a search frequency of the second segmented word set;

iii) calculating a similarity between the first segmented word set and the second segmented word set, determining that the similarity satisfies a defined threshold condition, merging the first segmented word set and the second segmented word set into a new segmented word set including the one or more first words and the one or more second words, and determining a new search frequency as a search frequency of the new segmented word set, wherein the new search frequency equals a sum of the first search frequency and the second search frequency;

iv) determining that the new search frequency satisfies a defined threshold condition; and v) assigning the new segmented word set as the keyword set in the user demand characteristics set; and matching the user demand characteristic set with a defined offline resource set to acquire offline resource information corresponding to the user demand characteristic set, the defined offline resource set comprising information of an offline brick-and-wall merchant and information of an offline server provider.

11. The apparatus according to claim 10, wherein the offline resource information comprises the information of the offline brick-and-wall merchant.

12. The apparatus according to claim 11, wherein the acquiring the user demand characteristic set according to the search formula included in the user search log information further comprises:

determining the new segmented word set as a target segmented word set;

performing clustering on segmented words in the target segmented word set having the search frequency satisfying the defined threshold condition;

determining a cluster keyword corresponding to the target segmented word set based on a clustering result, and replacing the segmented words in the target segmented word set with the cluster keyword; and assigning the target segmented word set, and the search frequency corresponding to the target segmented word set as the keyword set in the user demand characteristic set.

13. The apparatus according to claim 10, wherein after matching the user demand characteristic with the defined offline resource set, to acquire the offline resource information corresponding to the user demand characteristic set, the method further comprises:

scoring the offline resource information according to online attribute information of the acquired offline resource information; and acquiring high quality resource information in the offline resource information based on a scoring result, wherein the online attribute information comprises at least one of:

completeness of online data of the offline resource, a ranking value of online user evaluation for the offline resource, or a frequency of the offline resource appearing in user search logs.

14. A non-transitory computer storage medium storing computer readable instructions executable by a processor, the instructions, when executed by the processor, causing the processor to perform a method for mining offline resources, comprising:

acquiring at least two pieces of user search log information;

acquiring a user demand characteristic set according to a search formula included in the user search log information, the user search log information recording search behaviors of the user, the user demand characteristic set including a keyword set, wherein the acquiring the user demand characteristic set according to the search formula included in the user search log information comprises steps of:

i) extracting a plurality of search formulas from the user search log information, and counting respective search frequencies of the search formulas, wherein the plurality of search formulas comprises a first search formula including one or more first words and a second search formula including one or more second words, and the search frequencies comprise a first search frequency of the first search formula and a second search frequency of the second search formula;

ii) performing word segmentation on the search formulas to generate segmented word sets corresponding to the search formulas, and assigning the search frequencies of the search formulas as the search frequencies of the segmented word sets corresponding to the search formulas, wherein the segmented word sets comprise a first segmented word set including the one or more first words of the first search formula, and a second segmented word set including the one or more second words of the second search formula, wherein the assigning comprises assigning the first search frequency as a search frequency of the first segmented word set, and assigning the second search frequency as a search frequency of the second segmented word set;

iii) calculating a similarity between the first segmented word set and the second segmented word set, determining that the similarity satisfies a defined threshold condition, merging the first segmented word set and the second segmented word set into a new segmented word set including the one or more first words and the one or more second words, and determining a new search frequency as a search frequency of the new segmented word set, wherein the new search frequency equals a sum of the first search frequency and the second search frequency;

iv) determining that the new search frequency satisfies a defined threshold condition; and v) assigning the new segmented word set as the keyword set in the user demand characteristics set; and matching the user demand characteristic set with a defined offline resource set, to acquire offline resource information corresponding to the user demand characteristic set, the defined offline resource set comprising information of an offline brick-and-wall merchant and information of an offline server provider.

15. The method according to claim 1, wherein the set of brands is a set of brands of merchants.

16. The method according to claim 1, wherein the acquiring the user demand characteristic set according to the search formula included in the user search log information comprises:

clustering each of a plurality of keywords in the search formula with a set of brands, determining a matching keyword from the plurality of keywords in the search formula as a keyword consistent with a brand in the set of brands by the clustering, wherein the matching keyword is identical to the brand, and using the keyword consistent with the brand as a keyword in the user demand characteristic set.

17. The method according to claim 1, wherein the first search formula comprises a given keyword and a first keyword, and the second search formula comprises the given keyword and a second keyword different from the first keyword, wherein the first segmented word sets comprises the given keyword and the first keyword, and the second segmented word set comprises the given keyword and the second keyword, wherein the new segmented word set comprises the given keyword, the first keyword and the second keyword.

18. The method according to claim 17, wherein the new segmented word set further comprises the new search frequency and regional information.

\* \* \* \* \*